(12) United States Patent
Regler

(10) Patent No.: US 9,112,619 B2
(45) Date of Patent: Aug. 18, 2015

(54) MEDIA DELIVERY SYSTEM AND A PORTABLE COMMUNICATIONS MODULE FOR AUDIO AND REMOTE CONTROL OF INTERACTIVE TOYS OR DEVICES

(75) Inventor: Jason Regler, Westbury (GB)

(73) Assignee: REGLER LIMITED, Westbury (GB)

( * ) Notice: Subject to any disclaimer, the term of this patent is extended or adjusted under 35 U.S.C. 154(b) by 280 days.

(21) Appl. No.: 13/703,178

(22) PCT Filed: Jun. 10, 2011

(86) PCT No.: PCT/GB2011/051085
§ 371 (c)(1),
(2), (4) Date: Feb. 13, 2013

(87) PCT Pub. No.: WO2011/154746
PCT Pub. Date: Dec. 15, 2011

(65) Prior Publication Data
US 2013/0143482 A1 Jun. 6, 2013

(30) Foreign Application Priority Data
Jun. 10, 2010 (GB) .................................. 1009702.0

(51) Int. Cl.
*H04H 20/71* (2008.01)
*G09B 5/04* (2006.01)
(Continued)

(52) U.S. Cl.
CPC ................. *H04H 20/71* (2013.01); *G09B 5/04* (2013.01); *H04B 1/207* (2013.01); *A63H 30/04* (2013.01)

(58) Field of Classification Search
CPC ....... A63H 30/04; A63H 30/00; A63H 30/02; G09B 5/04; G09B 5/00; G09B 5/02; G09B 5/065; H04B 1/207; H04B 1/20; H04B 1/202; H04H 20/71; H04H 20/65
USPC ........... 455/3.06, 414.4, 418, 419, 41.2, 41.3, 455/552.1, 556.1, 557, 558, 92, 177.1, 267, 455/292; 434/308, 256; 700/94; 325/55, 64
See application file for complete search history.

(56) References Cited

U.S. PATENT DOCUMENTS

RE28,739 E * 3/1976 Wycoff ......................... 340/7.49
4,326,221 A * 4/1982 Mallos et al. ............ 348/211.11
(Continued)

FOREIGN PATENT DOCUMENTS

WO 2009122142 A1 10/2009

OTHER PUBLICATIONS

International Search Report for PCT/GB2011/051085.
(Continued)

*Primary Examiner* — Tan Trinh
(74) *Attorney, Agent, or Firm* — McClure, Qualey & Rodack, LLP

(57) ABSTRACT

A portable communications module (600) of FIG. 6 has an input (621) coupled to receive an incident signal. The input (621) split out a first audio channel containing a context audio track from the incident signal and directs the first audio channel along a first audio output path for selective audio output from a speaker (634, 620) either internally within or external to the module. The input (621)also directs a second audio channel in the incident signal to an RF audio transmitter chain for broadcast, the second audio channel comprising a composite audio signal from a plurality of audio tracks, each audio track embedded with a unique activation code that is present for substantially an entire duration of audio activity in each audio segment of each track. The input (621) is further arranged to apply a tone encoded signal in the incident signal to at least a tone decoder (640) in a data transmitter chain distinct from the audio transmitter chain (642). A microcontroller (650), responsive to recovered data, is arranged to translate the recovered data into a control signal related to functional control of remote equipment (102). And a data transmit chain (660) operates to modulate the control signal onto a carrier for broadcast to the remote equipment to effect its operational control. The tone encoded data is effectively filtered within the portable communications module to an extent that it is not amplified within the first audio output path and is not processed by the RF audio transmitter chain.

18 Claims, 7 Drawing Sheets

(51) Int. Cl.
   *H04B 1/20* (2006.01)
   *A63H 30/04* (2006.01)

(56) References Cited

U.S. PATENT DOCUMENTS

| | | | |
|---|---|---|---|
| 4,791,658 A * | 12/1988 | Simon et al. | 379/41 |
| 4,846,693 A | 7/1989 | Baer | |
| 5,081,667 A * | 1/1992 | Drori et al. | 455/404.1 |
| 5,214,793 A * | 5/1993 | Conway et al. | 455/500 |
| 5,636,994 A * | 6/1997 | Tong | 434/308 |
| 7,454,000 B1 * | 11/2008 | Henderson | 379/142.04 |
| 8,752,088 B1 * | 6/2014 | Harvey et al. | 725/38 |
| 2007/0055399 A1 * | 3/2007 | Litbak et al. | 700/94 |
| 2007/0293205 A1 * | 12/2007 | Henderson | 455/415 |

OTHER PUBLICATIONS

Ian Poole, "Newnes Guide to Radio and Communications Technology" REFEREX, Dec. 31, 2003, pp. 238-240.

Nakayama A et al. "Rich communication with audio-controlled network robot-proposal of audio-motionmedia" Robot and Human Interactive Communication, 2002, Proceedings 11th IEEE International Workshop on Sep. 25-27, 2002, Piscataway, NJ, USA, pp. 548-553.

International Preliminary Report on Patentability issued in relation to PCT/GB2011/051085.

* cited by examiner

MEDIA DELIVERY SYSTEM AND A PORTABLE COMMUNICATIONS MODULE FOR AUDIO AND REMOTE CONTROL OF INTERACTIVE TOYS OR DEVICES

CROSS REFERENCE RELATED APPLICATIONS

This application is a national phase of PCT/GB2011/051085 filed Jun. 10, 2011, which claims priority to Great Britain Application Serial No. 1009702.0, filed Jun. 10, 2010, both of which are entirely incorporated herein by reference.

FIELD OF THE INVENTION

This invention relates, in general, to interactive toys and controllers and is particularly, but not exclusively, applicable to toy dolls that synchronize their speech and movement with multi-media content from an entertainment source, such as a television programme or video played on a computer or the like. Additionally, the present invention relates to the provision of an ancillary control module that interfaces into a media player, computing device or the like to augment functionality of that player or device in the exercise of functional control over remote equipment, such remotely located toys and devices having controllable audio output or controllable operational functions.

SUMMARY OF THE PRIOR ART

It has been recognised that the learning process is often made easier when effective interactions arise between the learning source and the student. Indeed, it seems that there is an increased susceptibility to uptake of knowledge in situations which are perceived by the student to be fun, since the level of concentration is often higher and distraction less likely. And, in any event, interaction between several motorised toys (such as soft toys or mannequins) brings about a certain amount of intrigue and curiosity in young children.

Interactive audio-visual entertainment systems have been proposed where a remote device, such as a doll or plush toy, interacts with audio and/or visual content reproduced on a listening or viewing platform. For example, U.S. Pat. No. 5,636,994 describes an interactive system which includes a computer having a video output display and a pair of audio output channels. A program source, such as a CD-ROM, contains information which is processed by the computer to provide a visual presentation on the display and audio signals in the audio output channels. At least one input device is connected to the computer for controlling the manner in which the program information is processed and the audio signals are delivered to the audio output channels. One speaker is connected to the computer for reproducing sounds represented by the audio signals in one of the audio output channels, and the audio signals in the other channel are applied to at least one transducer in an animated doll. Transducers in the doll include a speaker for reproducing sounds to be made by the doll and actuators for moving parts of the doll, such as the mouth and eyes in accordance with those sounds. However, the system is unable to deal with selective switching of audio output. Control of the audio output from and movement of the doll is therefore actioned by a child through keystroke entry and mouse control at the interconnected computer.

In U.S. Pat. No. 5,636,994, multiple channels are made available to multiple dolls through the use of channel separation in the frequency domain. More particularly, a signal splitter at the computer effects channel separation by causing a frequency shift in one channel towards an upper end of the audio spectrum, i.e. 0-5 kHz frequency signals are translated or shifted to a frequency between 15 kHz and 20 kHz. At the splitter, selective high-pass or low pass filtering is then employed to separate out distinct channels for particular dolls, with a frequency down-shift applied (as appropriate) to recover the original audio for output by one of multiple dolls. Indeed, the tone is merely used to control the gate at the splitter to allow separation of different channels and subsequent selected communication of audio over an umbilical cord. Transmissions in the high frequency range can, however, be irritating if detected. Also, there is a cost associated with the splitting and frequency translation functions proximate to the computer and also the complementary processing at the receiver/doll that permits the multiplexing and de-multiplexing of essentially discrete signals.

WO 2007/029247 describes an audio switching system where the audio signal on one of the channels is re-directed to a transmitter for transmission to a remote device doll upon detection of an embedded actuation signal added to the audio channel for signalling the switching between modes. When switching occurs, the audio signal on the other channel is split to provide split mono-audio on both audio outputs. The arrangement requires a signal processor to be associated with at least one of the audio inputs and, consequently, provides a more complicated system that that of U.S. Pat. No. 5,636,994 discussed above.

FR 2834913 describes another interactive toy system. A toy, containing a permanent magnet, effects closure of a control circuit located in a base unit. Closure of the circuit therefore permits audio output from speakers connected to the base unit. Signals are initially provided to the base unit from an interconnected computer. A central base unit may act as a node to which additional secondary base units are connected. The central or main base comprises a processor that selects and shunts audio signals towards the secondary bases.

While these prior art interactive systems provide remote transmissions from a centralised computer to a doll, such as a cuddly bear (or the like), these systems are limited to the extent that the number of interactive elements (and the synchronization thereof) is seemingly restricted either by a limited bandwidth and/or delays associated with step-wise processing at nodes/distribution points through the system.

Also, existing interactive toys are effectively stand-alone systems that cannot be easily integrated with developing portable multi-media technologies, such as touchscreen computing devices/tablets (e.g. the iPad™ manufactured by Apple, Inc), or even existing technologies, such as HD televisions having HiFi sound systems.

In terms of soft control technologies, there are soft applications ("apps") that allow the functionality of a smartphone to be extended. For example, the "L5-Remote" application makes use of a removable dongle initially to educate the smartphone with IR frequencies utilised in television control. The smartphone is thus converted into a television controller.

In a similar vein, MungoScott produce a software program "Mungogamer" that converts a smartphone into a wireless games controller through the download and instantiation of software on a personal computing device. The software program interprets motion of the smartphone into a virtual environment (provided the game supports a USB steering wheel or joystick and the local computer has WiFi connectivity), whereby a virtual car can be controlled within the confines of a PC-based game. In practice, this means that the smartphone supports (for example) analog tilt steering and either tilt-based acceleration and braking or a touchscreen-based acceleration and braking. As a typical implementing technology, micro-machined accelerometers are frequently used to determine orientation of the smartphone or device. Single- and multi-axis accelerometers are available and operate to detect magnitude and direction of the acceleration as a vector quantity (which can then be used to sense orientation, acceleration and vibration). As will be appreciated, micro-machined accelerometers are often based onpiezoelectric, piezoresistive and capacitive components that convert mechanical motion into an electrical signal.

SUMMARY OF THE INVENTION

According to a first aspect of the invention there is provided a portable communications module responsive to an incident signal, the portable communications module comprising: an input configured: i) to split out a first audio channel containing a context audio track from the incident signal applied thereto, the input further arrange to direct the first audio channel along a first audio output path for selective audio output of the context audio track from a speaker either integrated with the portable communications module or external to the portable communications module; and ii) to direct a second audio channel in the incident signal to an RF audio transmitter chain for broadcast, the second audio channel comprising a composite audio signal from a plurality of audio tracks, each audio track embedded with a unique activation code that is present for substantially an entire duration of audio activity in each audio segment of each track; and iii) to apply a tone encoded signal in the incident signal to at least a tone decoder in a data transmitter chain distinct from the audio transmitter chain; a microcontroller coupled to the tone decoder, the microcontroller arranged to interpret and translate the tone into a control signal related to functional control of remote equipment; and a data transmit chain, responsive to the microcontroller, the data transmit chain arranged to modulate the control signal onto a carrier for broadcast to the remote equipment to effect functional control thereof; and wherein the tone encoded data is filtered within the portable communications module to an extent that it is not amplified within the first audio output path and is not processed by the RF audio transmitter chain.

In another aspect of the present invention there is provided a portable communications module having: an input for receiving tone-encoded signals;a tone decoder coupled to the input and responsive to the tone encoded signals;a microcontroller coupled to the tone decoder, the microcontroller arranged to interpret and translate the tone to produce control signals representative of actions attributable to the received tone encoded signals; and a data transmit chain, responsive to the microcontroller, the data transmit chain arranged to receive and modulate the control signal onto a carrier for broadcast to remote equipment to effect functional control thereof.

In a further aspect of the invention there is provided a media delivery system containing the portable communications module according to the first aspect and at least one of a smartphone and a media centre, said one of the smartphone and media centre coupled to the communications module and arranged to provide the incident signal to the portable communications module.

Advantageously, the present invention an interactive toy or mannequin system that is highly synchronized. Furthermore, use of embedded activation codes (such as CTCSS tones or DTMF) results in a toy that can only become active upon receipt of legitimate media content relevant to the toy; this prevents tampering with the toy, e.g. getting the toy to say undesired dialogue, etc). Controlled embedding of activation codes can also effect regulation of media content by restricting production of third party content.

Beneficially, since the toy's speaker is only switched on when it is receiving tones/dialogue, this greatly reduces the risk of interference. The various embodiments can, furthermore, be produced in a cost-effective manner using relatively inexpensive PIC technologies. And the use of the activation codes produces a stereo effect, notwithstanding that the audio tracks are consolidated onto a single audio channel, e.g. the left channel of a stereo system.

The portable control module and player of the invention thus permits ready adaptation of existing multi-media players (such as an iPad™ or the like) into an interactive audio system having disparately located speakers arranged to provide interactive audio from different location. Local audio output capabilities of the portable control module can be selectively switched to make preferential use of speakers associated directly with the multi-media players, whilst logic in the control module operates to transmit embedded activation codes within a received audio signal (emanating from the media player or associated storage device) to control operation of interactive but remote devices having sensory output capabilities, such as an audio output and/or a visual output.

Additionally, the portable control module can also be configured to support (typically) license-exempt transmissions to affect local control of electrically-operable devices, with the control module making use of an interface on the multi-media player to correlate input motions on the interface to data control for selective output from the multi-media player, smartphone, computer tablet or the like.

BRIEF DESCRIPTION OF THE DRAWINGS

Exemplary embodiments of the present invention will now be described with reference to the accompanying drawings, in which.

DETAILED DESCRIPTION OF A PREFERRED EMBODIMENT

Figure 1:
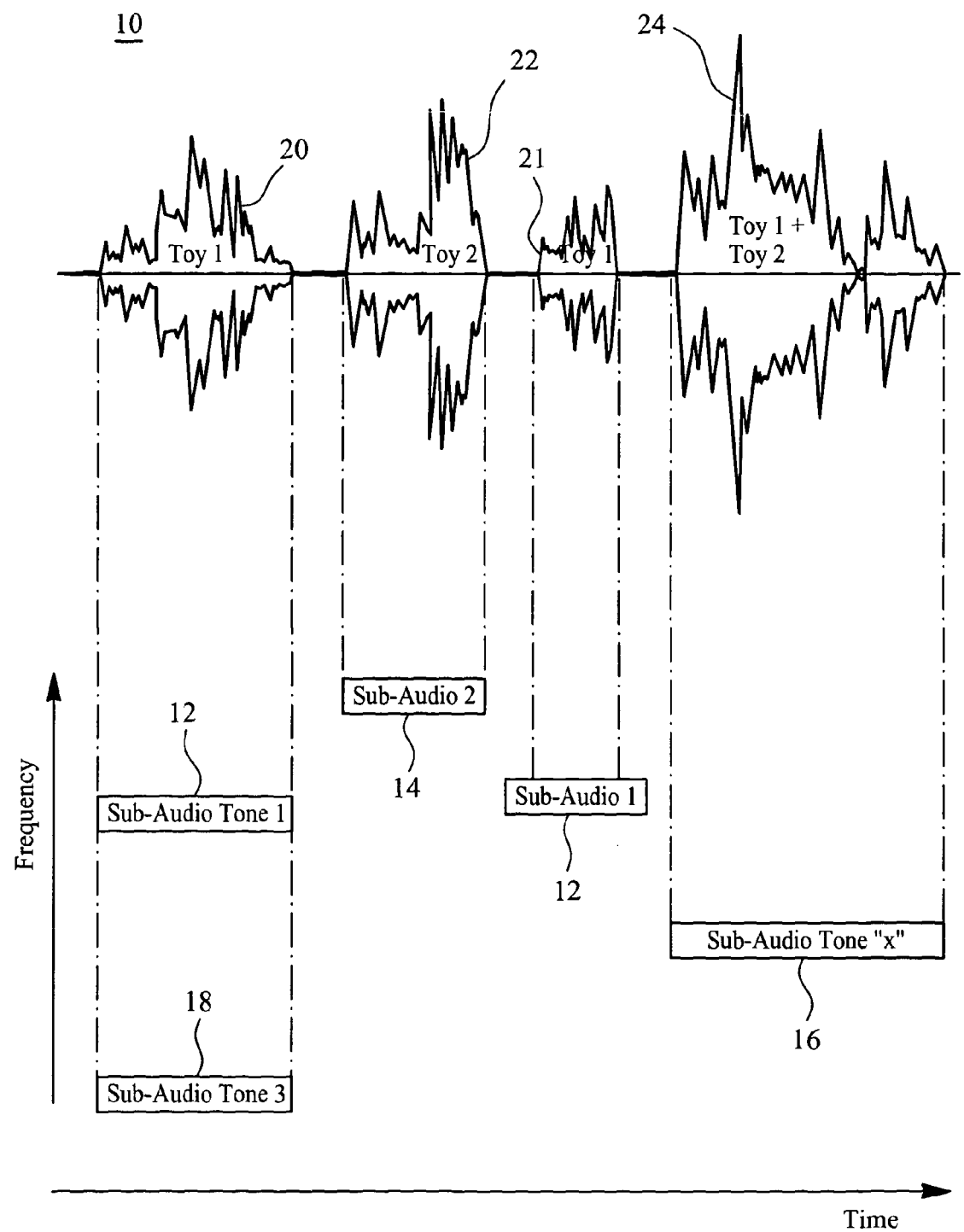
FIG. 1 is a waveform diagram that reflects a sub-audible tone encoding process according to a preferred embodiment of the present invention.

Turning to FIG. 1, a waveform diagram 10 illustrates how (in accordance with a preferred embodiment of the present invention) sub-audible tones 12-18 are encoded relative to time disparate audio segments 20-24 designated for one or more toys. For a specific toy, a succession (but not necessarily a contiguous succession) of audio segments (such as speech envelopes 20 and 21) constitute an audio track for that particular toy. Therefore, the audio track may contain pauses where the toy is silent. In a preferred embodiment of the invention, each audio segment for each toy is assigned a common identifying code in the form of a CTCSS signal which is preferably present for the entire duration of the speech envelope, albeit that minor timing variations may also acceptable. The CTCSS signal therefore rises at substantially the beginning of the speech envelope and then ceases at substantially the end of the specific speech envelope.

Therefore, a first toy ("Toy 1") will have a first sub-audible tone 12, whereas a second toy will have a second, but different sub-audible tone 14. At points in time when the audio segment is itself a composition of multiple audio outputs from multiple toys, another different sub-audible tone 16 ("sub-audible tone x") is applied to all associated toys. It is also contemplated that a particular toy may have a further ancillary control tone 18 (such as sub-audible tone 3) applied within its speech envelope, which ancillary tone 18 may be for a duration less than or equal to the duration of the speech envelope 20. In fact, the ancillary tone 18 may punctuate the primary tone or code multiple times during a single speech envelope (for reason that will become apparent), or the ancillary tone can replace the primary tone during speech envelope to produce a secondary effect (such as head movement) in a bear that is already interactively singing by virtue of the existence of the primary sub-audible tone.

The sub-audible tones (or codes, as the case may be) are therefore taken from a tone/code library that cross-references the toy to the tone/code. Mixing of the sub-audio tones into each audio segment is through conventional, signal-processing techniques known to the skilled addressee. The sub-audible tones 12-18 therefore act to control and synchronize operation of an interactive toy located remotely from a central media player, such as a computer.

CTCSS is an acronym for "Continuous Tone Coded Squelch System". CTCSS is a sub audible tone in the range of 67 Hz to 254 Hz. Conventionally, any one or more of about fifty tones (sometimes referred to as "sub-channels") can be used to gain access to a repeater in a two-way radiotelephone system. Each CTCSS is therefore essentially a sine wave having a specific frequency.

Figure 2:
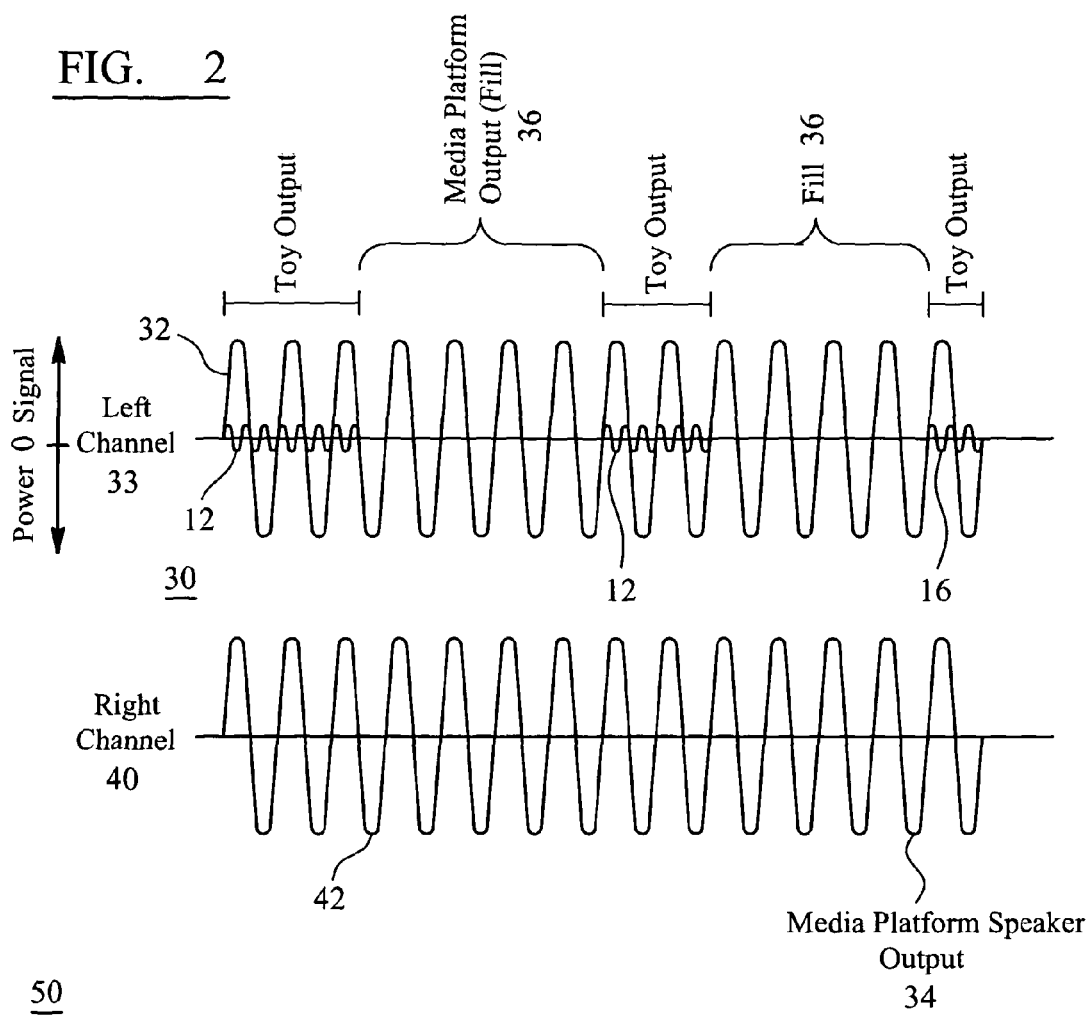
FIG. 2 is a waveform diagram showing relative timing between a broadcast composite signal envelope and a related media platform speaker output obtained from the sub-audible tone encoding process of FIG. 1.

To appreciate further the nature of the present invention, reference is made to FIG. 2 which is a waveform diagram 30 showing relative timing between a broadcast composite signal envelope 32 and a related speaker output 34 from a central media platform. For ease of reproduction only, the audio channel is shown as a simple undulating wave, rather than the underlying and more complex amplitude-varying form shown in FIG. 1.

In FIG. 2, audio for remote generation at a remote speaker at a remote toy is consolidated (mixed down) into a composite signal envelope 32 that is assigned for transmission on the left channel 33 of a stereo audio circuit. Each speech envelope (e.g. reference numeral 20 of FIG. 1) has been mixed with its assigned control tone 12 or code; this is represented by the overlaying of the small amplitude control tone and the instantaneous audio output. The control tone or code preferably has a relatively low power level compared to the magnitude of the speech components in the speech envelope 20-24; this reduces the likelihood of introducing distortion, such as harmonics, into any audio signal recovered from the composite signal envelope 32 for output.

To provide an effective reference in time for delivery of the audio signal from each toy, some form of "fill" or buffering 36 is included, if necessary, to time separate adjacent audio outputs from one or more remote toys. For example, time buffering 36 can take the form of background media channel output earmarked for reproduction on a media player speaker remote from the interactive toy.

If audio output from different toys is exactly contiguous, then time buffering 36 may not be required for a certain portion of a scene. In this case, the unique tones or codes provide a context for synchronized output for the various toys.

A right channel 40 of the audio circuit is assigned to communicate speaker output 42 that, together with encoded toy-specific audio, produces the interactive effect or background context between a remote interactive toy and a central media player, such as a computer.

In other words, to begin with, the audio desired for output from each remotely located toy is placed entirely on one audio channel. A sub-audible tone relevant to activating a first toy is then placed on an audio content timeline for the duration of that character's speech. The advantage of this is that the decoder in the toy becomes significantly less likely to miss a tone, as it constantly receives input. The result is that when the timeline exceeds the first toy's speech, the CTCSS decoder inside the toy becomes inactive and no more sound comes from the first toy. When the timeline reaches a point where a second toy becomes audibly active, an entirely different sub-audible tone is placed on the timeline for the duration of the second character's speech. The result is that the CTCSS decoder inside the first toy does not recognize the sub-audible tone set for the second toy and therefore remains inactive, whereas the second toy commences operation or remains active for the duration corresponding to the presence of its sub-audible tone or activation code.

As previously indicated, a single toy can also be programmed to respond to several sub-audible tones. For example, a tone of 67 Hz can be assigned to activate the speaker and make the first toy sing, whereas a tone of 71.9 Hz can make the first toy dance for the period the tone is being received, whereas a tone of 74.1 Hz can make the toy dance and sing at the same time. As previously indicated, this process can also be used in combination with other toys. For example, a tone of 67 Hz can make the first toy sing on its own, whereas a tone of 71.9 Hz can make the second toy sing on its own and a tone of 74.1 Hz can make both toys sing together.

Figure 3:
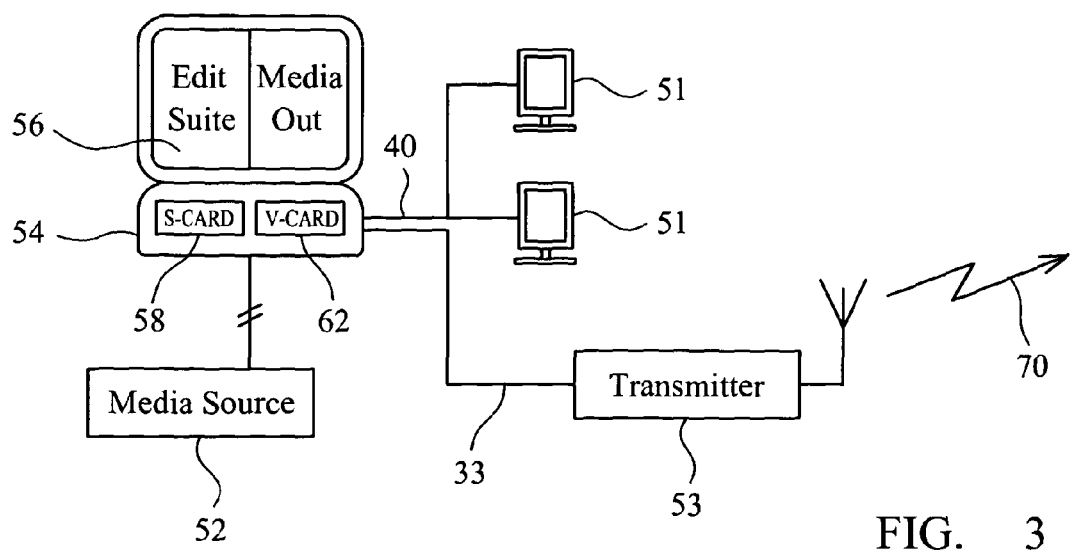
FIG. 3 is a schematic representation of a preferred arrangement for an interactive media suite, including an output chain.

FIG. 3 is a schematic representation of a preferred arrangement for an interactive media suite 50, including an interactive output chain including speakers 51 and a transmitter 53. A media source, such as a DVD or multi-track recording from a television or advertising company, is uploaded from a suitable player or drive 52 into a computer 54 (or equivalent media player). The computer 54, which may be a conventional PC having a dedicated editing program 56, allows a user to deconstruct the entire media package to recover individual channels that are then assigned and encoded with their unique sub-audible tones, as previously explained in relation to FIG. 1 and FIG. 2. The editing program 56 furthermore supports the compilation of the composite signal 32 that defines time synchronization between at least two different audio outputs. For a multi-media application containing voice and image content, the editing program 56 also ensures appropriate synchronization between the video and related audio content, as will readily be appreciated.

The computer 54 typically includes at least a sound card 60 that supports the reproduction of stereo audio through at least two speakers 51. Usually, stereo output from the speakers 51 is managed through the use of discrete left and right audio channels, although the present invention makes use of hardware and/or software selectively to cause the right audio channel 40 to be relayed to both stereo speakers 51 to produce a dual mono effect from directly coupled speakers. Circuitry and software to implement the split of left and right audio channels is well known to the skilled addressee. The left audio channel 33 is routed to the transmitter for modulation and local broadcast. Components in the transmitter 53 are well known to the skilled addressee, although are dependent upon the exact nature of the transmission protocol. In a preferred embodiment, the transmitter makes use of wireless transmissions, such as radio frequency and/or BlueTooth® technology (or the like), to broadcast 70 suitably modulated signals. Preferably, the power in the broadcast is restricted to limit reception to approximately ten metres and preferably less than about five meters.

It will, of course, be understood that wireless transmission is preferred, but not essential. Other forms of communication interface may be used to effect transmission of content from the transmitter to a toy, e.g. a wired connection or optical transmissions.

The computer 54 also preferably includes a video card 62 to allow for visual output that is further synchronised and interactive with the audio (and, if configured, video) output for the remote toys. Video content is therefore provided conventionally either to the computer's display, or otherwise via a video output jack. Video frame synchronization with audio content is well known to the skilled addressee, with the additional encoding of sub-audible tones supplementing the general video-to-audio synchronization to effectively guarantee the synchronization of at least remote audio to local audio and/or video. As will be understood from the foregoing, this means that a ambient backing audio track may be driven from the local speakers (associated with the media player/computer) whereas voice associated with a particular character (on a second channel) would be suitably modulated and broadcast by the transmitter 53, identified by the embedded sub-audio tone at a specific remote toy and then decoded and emitted from speakers in that particular character.

Figure 4:
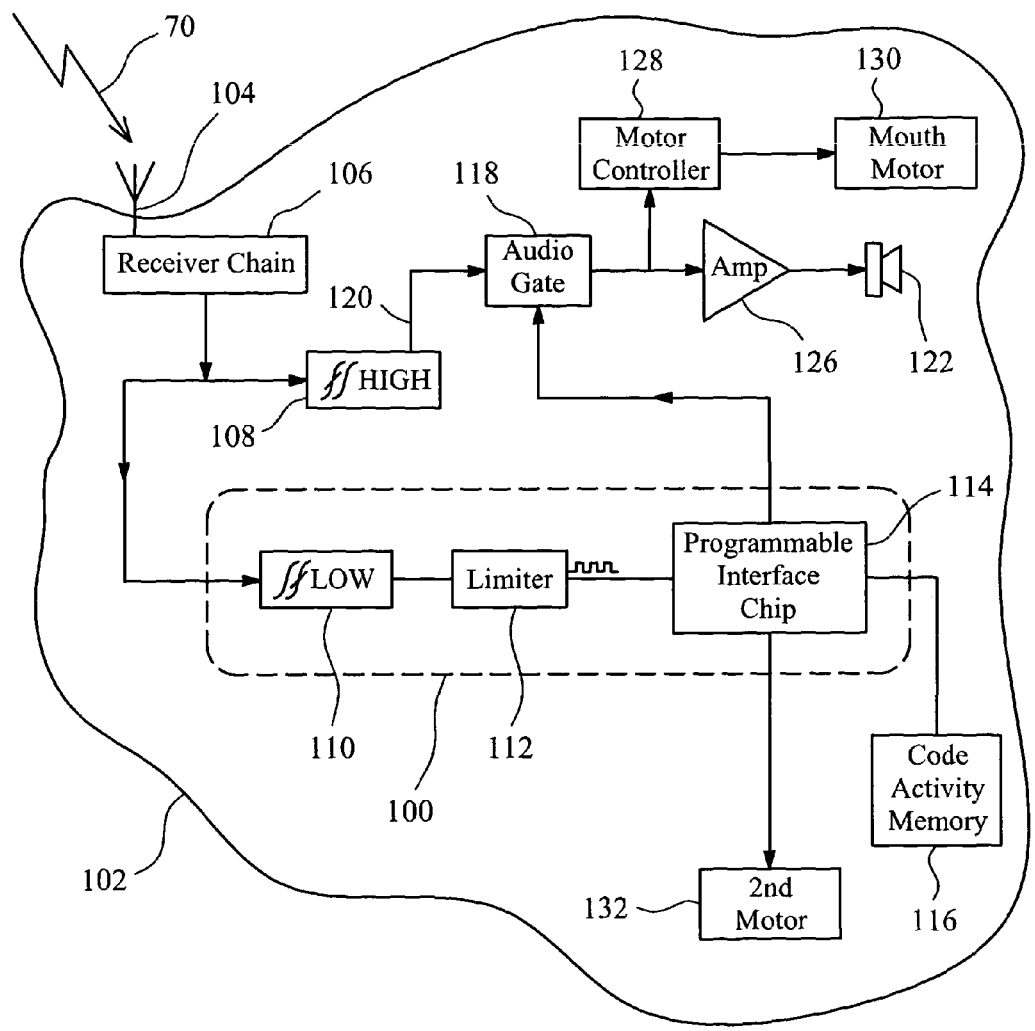
FIG. 4 is a schematic representation of a preferred receiver assembly in a toy, the receiver assembly permitting selective recovery of output data from the composite signal envelope of FIG. 2 and interactive engagement with the media suite of FIG. 3.
Figure 4:
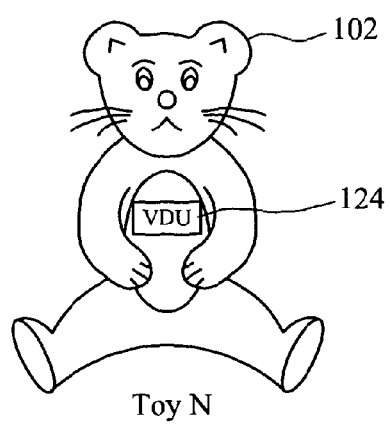

FIG. 4 is a schematic representation of a preferred receiver configuration 100 in a toy 102, the receiver configuration 100 permitting selective recovery and local generation of synchronized output data from the composite signal envelope of FIG. 2.

In FIG. 4, a plurality of toys 102 is shown. Each toy may be a different character and thus subject to a different track and audio content assignable from an original programme or song. For example, a first toy 102 may be produced in the image of the character "Kermit the Frog", whereas a second toy might be the "Swedish Chef", with both characters interacting at different points within a video, TV programme or recorded song. The interactive audio content communicated to each toy is therefore tailored to the characters by virtue of the assigned sub-audible tones.

An antenna 104 is coupled to a conventional receiver chain 106. As will be understood, the receiver chain 106 includes (amongst other components) a suitable demodulator, a pre-amplifier and a mixer. An output from the receiver is coupled to both a high pass filter 108 and a low pass filter 110. The low pass filter 110 removes audio content to effect recovery of any sub-audible tone present in the recovered composite signal (emanating from the receiver chain). In response to any signal passed through the low pass filter 110, a limiter 112 operates to provide a discrete transition, i.e. to produce a square wave, which can be applied to and readily assessed by a programmable interface chip (PIC) 114. The PIC 114 (sometimes interchangeably referred to as a microcontroller) therefore operates to identify and decode any sub-audible tone (or other form of coding) mixed with relevant audio content.

In another embodiment, the low pass filter 110, limiter 112 and PIC 114 is instead realised by a digital signal processor (DSP).

The PIC 114 for each toy is provided with a list of sub-audible tones (or embedded signal codes). This list of codes, stored in a memory device 116 or effectively by appropriate hard-wired logic, determines whether the toy is to react to the recovered signals output from the receiver. If the recovered sub-audible tone matches an identified activation tone, an output of the PIC 114 opens an audio gate 118 that is located after an output 120 of the high pass filter 108. The high pass filter 108 is therefore arranged to suppress sub-audible tones and pass audio signals potentially relevant for local regeneration and output from a local speaker 122, whereas the audio gate 118 controls whether these signals are heard from the speaker 122 (or seen if there is a related video display 124 in the toy). Prior to output from the speaker 122, signals are amplified in amplifier 126.

An output from the audio gate may also be tapped and sampled by a motor controller 128 arranged to control a first motor 130. More specifically, motor control can control the instantaneous degree of movement of the motor in response to relative sensed amplitudes in the recovered and relevant audio signal targeted to the specific toy at a specific time.

The PIC 114 may also provide direct control to at least one second motor 132, such as a motor controlling an arm, leg or facial expression, but this is a design option. For example, the PIC may make use of a detected ancillary tone 18 to actuate additional motors in the toy.

In other words, according to a preferred embodiment, each toy includes a CTCSS decoder that is set to respond to a different, specific sub-audible tone in the defined CTCSS frequency range. When the toy is on, the toy's audio receiver constantly receives the audio information transmitted from the audio source. However, unless the CTCSS decoder receives its specific sub-audible tone, it will stop all received audio from reaching the amplifier 126 and motor controller, e.g. an audio sensitive board. The toy will therefore not move and no sound will come from the toy. When the CTCSS decoder receives its specific sub-audible tone, it will allow the received audio to reach the amplifier 126, whereby the toy's motors will move and sound content corresponding to the character will be output from the toy's speaker. As soon as the CTCSS decoder, e.g. PIC 114, stops receiving relevant CTCSS tones, sound output and related motor operation is stopped.

Figure 5A:
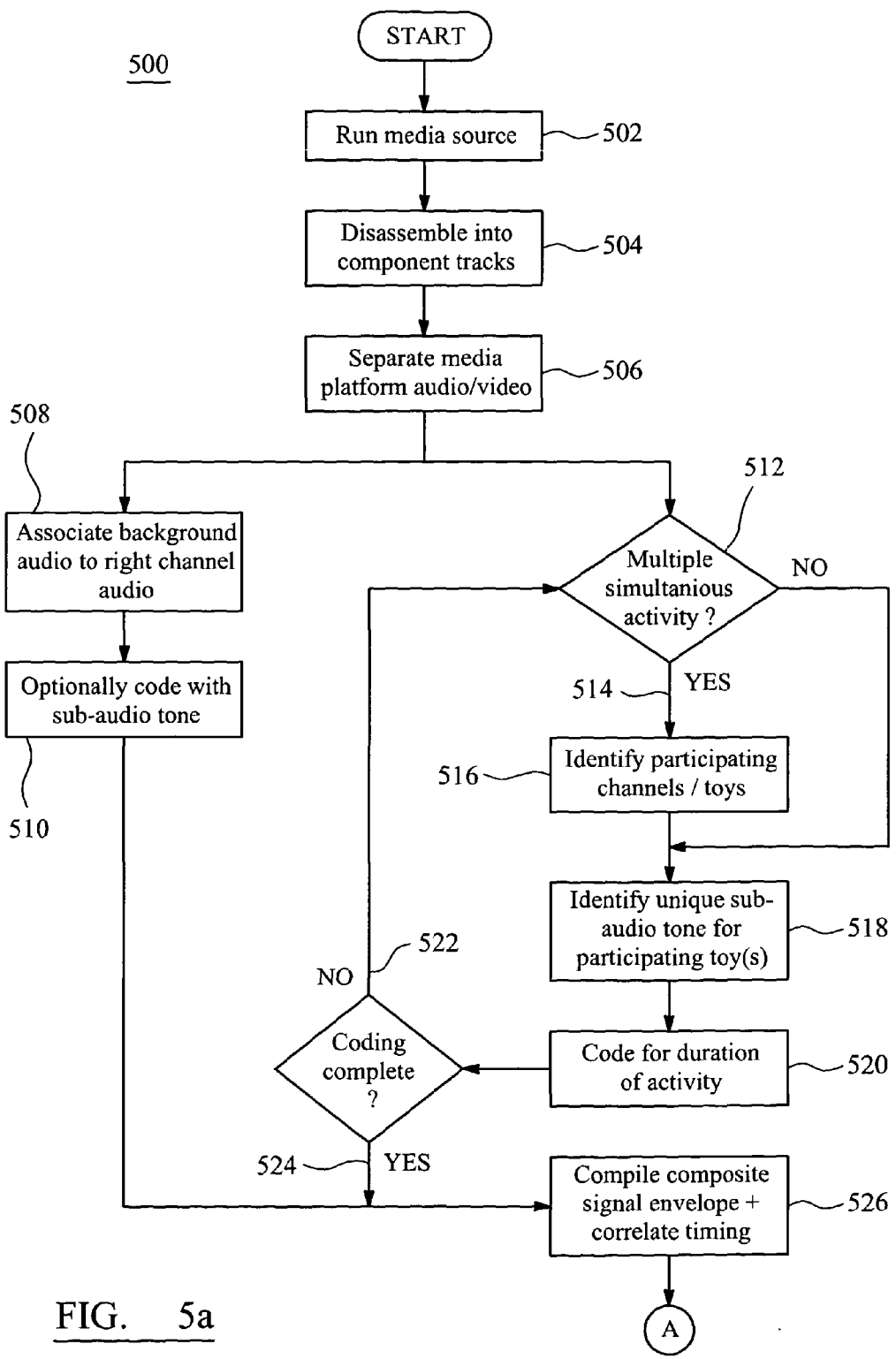
FIG. 5 is a flow diagram of the process for encoding and recovering interactive media according to a preferred embodiment of the present invention.
Figure 5B:
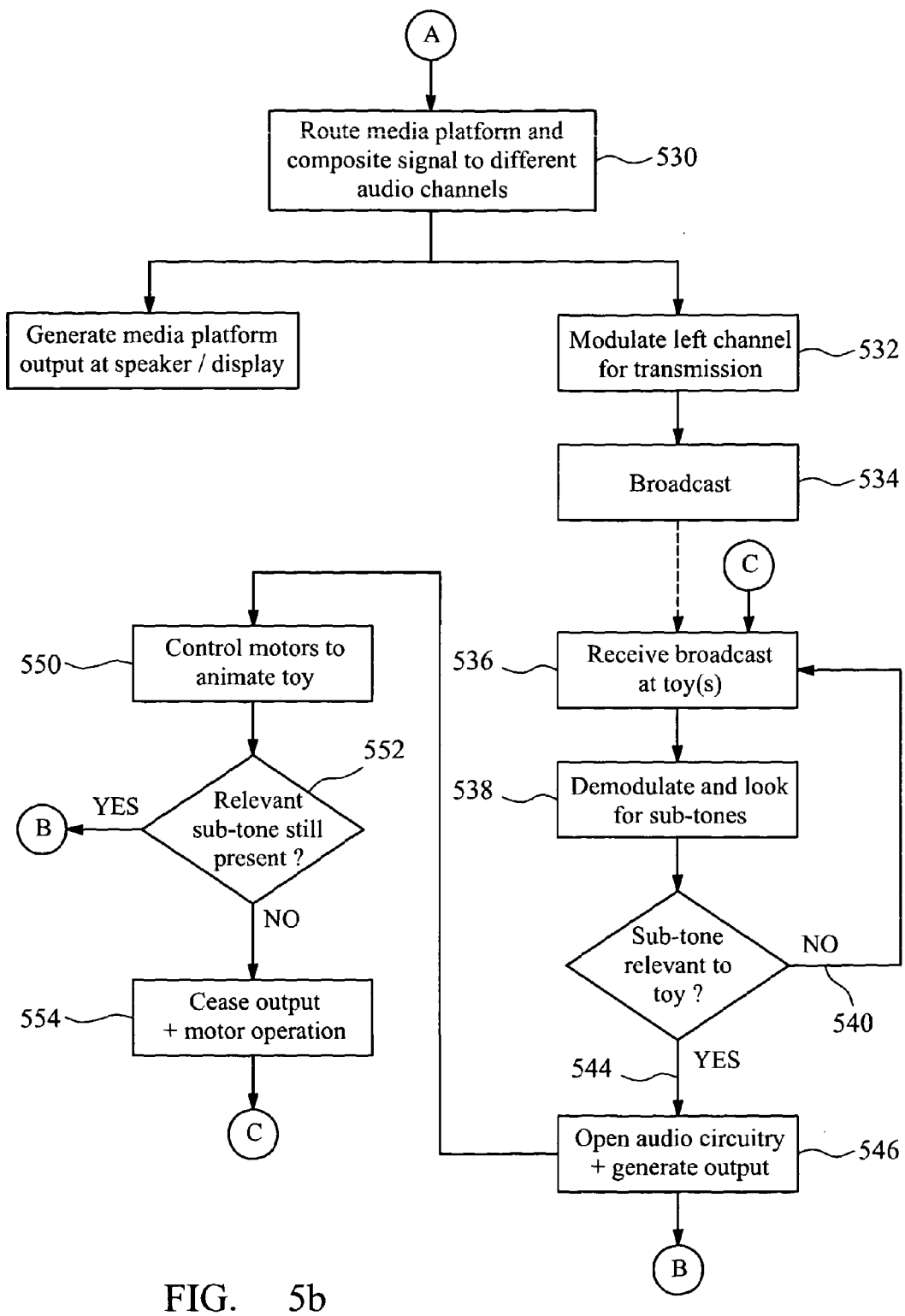

Turning to FIG. 5 (comprised from FIGS. 5a and 5b), a flow diagram of the process 500 for encoding and recovering interactive media according to a preferred embodiment is illustrated.

The process begins 500 with the loading and running 502 of a media content source 52 containing at least multiple audio tracks, but preferably audio tracks and related video content. The media content source 502 is stripped down, i.e. disassembled 504, into component audio tracks that may overlap in time with one another, but may also be distinct in time. At 506, background content (that provides the reference point for at least audio interaction) is separated out, with the background content then assigned 508 to the right audio channel of an audio circuit. Optionally, but preferably, the background audio is coded 510 with a sub-audible tone that uniquely identifies the background content for local use at the computer (or discrete device) of FIG. 3.

An assessment 512 is then made as to whether the remaining audio tracks (for interactive play/output at the remote toys of FIG. 4) contain overlapping activity. In the affirmative 514, the process identifies 516 the participating channels (and thus the participating characters/toys). These channels are encoded 518 with a pre-selected and unique sub-audible tone that, ultimately, will uniquely control operation of at least one animated motor-driven function in each of at least two interactive toys. If there is only one active track (as determined at step 512) for a segment of time/specific duration, then that track is encoded with its own unique and pre-assigned sub-audible tone 18 for the entire time/duration 520. If the coding of the original media content is not complete 522, then the coding regime continues with a return to step 512, otherwise confirmation 524 permits a composite signal envelope (see FIG. 2) to be produced 526, which composite signal envelope includes: i) character audio content; ii)correlated timing (i.e. buffering) between tracks' relative activity/inactivity; and iii) sub-audible coding to uniquely identify the start and cessation of specific interactions and specific character movements.

At 530, the system is configured to effect routing of the media content (i.e. the background or context) to a first audio channel in an audio circuit, whereas the composite signal is routed to a different audio channel. In this way, the point of reproduction of the background content is separated from the remote point of reproduction of the audio content associated with particular toys.

The composite signal can then be appropriately modulated 532, if necessary, for transmission 534 in the form of broadcast signal 70 (of FIG. 4).

At each of the receivers, i.e. each of the remote toys 104, the receiver chain receives 536 the broadcast and demodulates (if necessary) any received signal and looks for 538 sub-audible tones relevant to its function. More specifically, incoming audio from the receiver is preferably passed through parallel active filters (one via an audio switch). A low pass filter removes most of the speech and music audio leaving the sub-audio tone, which tone is then fed into a limiter to produce a square wave. The microprocessor operates to capture and compare this squared input. A high pass filter operates as an audio switch controlled by the microprocessor to switch the audio on/off. The high pass filter operates to remove most of the sub-audio activation code and therefore leaves the speech and music to be fed to an audio power amplifier and speaker. In operation, the microprocessor measures the period of each cycle of the sub audio and compares these measurements to a pre-defined list of valid frequencies. When a valid frequency (i.e. a relevant activation code) is determined to be present in the incident signal, the audio switch is turned on to allow the speech/music to pass to the audio power amplifier.

Multiple sub-tones could be broadcast for receipt by to a single remote toy or toys, with the multiple sub-tones interpreted at a specifically addressed toy to control multiple functions, such as a walking and talking.

If no relevant tone or code is identified, the toy remains in an active search loop 540 but is otherwise dormant (from at least an audio output perspective and typically both an audio and movement perspective). Of course, the toy may be powered down in which case the toy is inactive. If the toy is powered up and a relevant tone is detected (at any point in time) 544, the audio gate is opened and a sound output generated 546 via the toy's speaker.

With a positively identified embedded tone or code, local motors are therefore energized 550 to animate the toy in a controlled fashion reflective of the pre-assigned meaning associated with the embedded code. The rate of operation of the motor or the extent of the operation can be determined locally based on instantaneous variations in the audio content power in the received composite signal, but this is optional and reflects one method of control. The toy, over time, continues to look for and identify 552 relevant embedded codes and will either cease audio output and motor operation 554 or continue both to maintain the audio output open and to effect relevant motor control.

Synchronicity between the left and right audio channels (and therefore the media platform output at the central speaker and the interactive output at the remote speakers) is maintained because of the inherent synchronization and alignment between the left and right audio channels. Processing of the left channel, while taking a finite time, has a negligible effect on synchronization between the remote toys and the central medial player/platform.

The encoding regime and interactive audio tracks may therefore be embodied in a computer program and supplied on a computer program product, such as a USB memory stick or the like.

Figure 6:
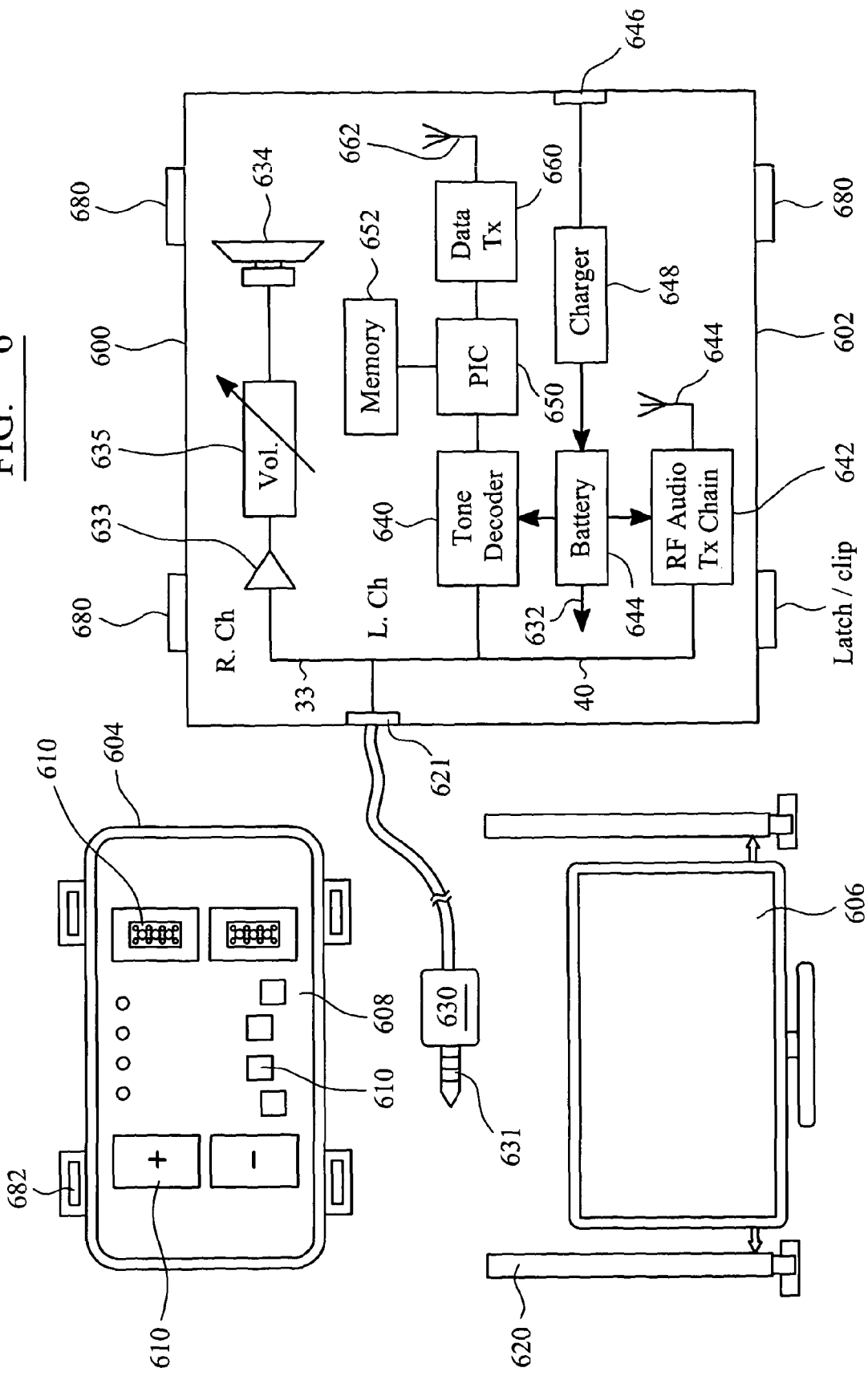
FIG. 6 is a block diagram of a portable control module and player according to a preferred embodiment of the present invention.

Referring to FIG. 6, there is shown a block diagram of a portable control module and player 600 (hereinafter "portable module 600") according to a preferred embodiment of the present invention. The portable module 600 includes a housing 602 containing many conventional electronic and electrical circuit components arranged into at least a selectively operable audio output chain and at least one transmitter chain (and most preferably at least two transmitter chains). The portable module 600 is shown in the context of media source player 604 which, for example, could be a smartphone or a media centre 606.

The media centre 606 provides media content to the portable module 600, the media content being in the form described herein with reference, for example, to FIGS. 1 to 5. Similarly, the media source player 604 includes memory in which is loaded and/or stored (at least) a compiled multi-track recording or media application from (for example) a television or advertising company or an media application, the multi-track recording thus representing coordinated instructions for production of an interactive sensory experience between interacting toys. The media application may, for example, relate to downloadable game or audio "app".

The media source, in one embodiment, may take a direct feed from one or more audio inputs (such a plurality of microphones for the input of speech or a music source, such as a CD track) and then applies a unique sub-audio tone to each input to produce a composite audio signal having, if desired, a (backing) context audio track. In this way, a context audio track 42 is assigned to a first channel in an audio system supporting at least two channels, with a composite audio signal also produced from a plurality of audio tracks, wherein each audio track is associated with a specific interactive toy. Since the composite audio signal is assigned to a second, different channel of the audio system and a unique activation code is assigned and embedded into each track, interactive control of different toys (or physical elements, such as lights) is achieved through identification of the embedded activation code at each toy. As previously explained, the activation code is present for substantially an entire duration of activity of each sensory output (e.g. speech) segment on each track. The composite audio signal can be communicated to the portable module 600 in real time, or otherwise recorded and then communicated to the portable module 600.

To effect coding (e.g. the on-the-fly application of a CTCSS sub-audio tone to each input) of this embodiment, the media source makes use of a local signal processor to sample the analog audio signal and to embed an appropriate, selected or predetermined sub-audio tone or code. Buffering of the audio input may be required for a limited period whilst the composite signal is assembled. A sub-audio tone library is stored in local memory, which memory is accessed by the local signal processor to acquire the appropriate sub-audio tone for a remote toy that is to be interactively addressed in a subsequent broadcast transmission from the transmitter chain in the portable module 600.

The media centre 606 may take on a number of guises, including a TV and combined home cinema system with high specification stereo speakers 620 or a computer with audio drivers and surround sound speakers, e.g. a tablet or smartphone. The actual arrangement is generally one of design choice and is not critical to the underlying invention, save for the facts that the media centre 606 may provide (either directly or indirectly) appropriate media content to the portable module 600 and output from the speakers 620 may be affected/controlled by the operation of the portable module 600 (as will be described below).

In a particular embodiment, the smartphone includes a touchscreen display 608 and a user interface realised by "soft", configurable buttons 610 (as known in the art). Functionality associated with the soft buttons 610 is determined by the specific application and may relate, for example, to motion controls (such as "left", "right", "up", "down" and/or "yaw") or specific commands (such as "on", "off", "open", "close", "increase" and/or "decrease"). The smartphone therefore includes programmed memory for storing operational programs and/or data and a processor configured to execute code to produce and control both its man-machine interface and overall functionality of an active smartphone.

The smartphone 604 may include an integrated audio speaker, but equally it may only have an audio output jack to drive headphones (as is the prevalent configuration in many MP3 players). For reasons of cost, any integrated speaker on a smartphone, if present, is usually of relatively low quality with a limited audio response and limited audio range.

Returning to the exemplary arrangement of FIG. 6, the portable module 600 includes an input connector 630 (such as a standard four-pole audio jack 631 containing ground, left channel, right channel and video/data) that engages, in use, into a corresponding output socket on either the media centre 606 or media source player 604. The input connector 630 therefore permits the portable module 600 to receive audio and/or data signals (at input 621), such as the aforementioned multi-track composite audio signal (exemplified in FIG. 3 by reference numerals 33 and 40).

The portable module 600 is arranged, at its input 621, to split an incident signal (received via connecting lead 632) containing the context audio channel from the encoded speech/data channels, such that the right (context) audio channel is routed through a first audio path (including amplifier 632) to a speaker 634 for output. A potentiometer 635 (or the like) may be used to control overall output volumes, with the potentiometer located before the speaker 634, as will be understood.

The left channel 33, containing encoded speech and/or tone-based control signals, is applied in parallel to a tone decoder 640 and a conventional RF audio transmit chain 642, or some equivalent wireless transmit chain. As described above, the left channel audio is therefore wirelessly broadcast from the antenna 644 of the portable module 600.

The tone decoder 640 is controlled by a programmable interface chip (PIC) 650 that has associated memory 652. Tones, such as DTMF tones, output as a consequence of depressing soft buttons 610 on the smartphone can thus be interpreted by the PIC (of the portable module 600) and converted into a control signal (at, for example, a particular frequency and/or modulated in a predefined format) that is processed in a data transmitter chain 660 and finally broadcast from a related antenna 662. Data transmissions will therefore be periodic and dependent upon detection of generated control tones (such as DTMF tones) associated with a control function programmed into the man-machine interface of the smartphone 604.

More specifically, data that is delivered to the portable module 600 is produced from the man-machine interface on either the smartphone or the media centre 606. According to a preferred embodiment of the present invention, this data is communicated as control tones on (preferably) a selected one of the stereo audio channels, e.g. the left audio channel. These control tones are interpreted by the decoder 640 and PIC 650 of the portable module 600 and commuted into a recognizable data transmission format aligned with control of an external device, such as an automated garage door mechanism or a radio controlled toy, e.g. an aeroplane. Appropriate programming and configuration of soft buttons 610 presented on the touchscreen display 608 and corresponding programming of the PIC 650 (and a look-up table in memory 652 that correlates control tones to commands) therefore allows the smartphone to take on additional functionality that controls an object in the real world, e.g. lighting effects associated with toys or their surroundings.

For example, DTMF tones provided from the smartphone 604 over the left audio channel may be converted/modulated in the portable module 600 as licence-exempt, low-power signals for radio frequency model control at 49 MHz or at 2.4 GHz for Wideband Data Transmission Applications (WB-DTS). These frequencies are not limiting, but represent usable space within the UK radio spectrum. The nature and construction of the transmitter chains will be readily appreciated by the skilled addresses, since their components are readily known whilst the explicit arrangement is entirely dependent upon the format of the broadcast signal. A detailed discussion of such transmitter chains is therefore not considered necessary for understanding of the present invention, with it suffice to say that a skilled person will readily appreciate that a transmitter chain will typically include:a power amplifier,filters and a modulator (etc.) under the operational control of a processor.

It will, of course, be appreciated that data transmissions from the portable module 600 must be received by a suitably configured receiver that is functionally configured to actuate or control an event. With respect to RF-controlled cars and garage opening mechanisms, the existing hardware already includes the appropriate receiver(s). For new control applications, a receiver, control logic and actuator would be packaged, programmed and supplied with the portable module 600, with this remote receiver package allowing interconnection to and control of the hardware to which it was connected.

Conversely, encoded audio delivered from the media player 604 or media system 606 preferably makes use of uniquely encoded CTCSS activation codes (or their equivalent), with no interference arising as a consequence of the use of different transmit chains and different coding schemes.

In one embodiment, the data transmitter and the functional commuting of an incident encoded data signal (by the local microcontroller and RF data transmit chain) into a modulated RF ("wireless") control signal broadcast from the portable module can be entirely implemented independently of the interactive audio processing of the left and right stereo channels. In the alternative, the background context channel is provided to a first audio path which feeds either an internal speaker or otherwise routes the audio signal in, typically, a forced mono capacity to external speakers associated with the media centre 606. The second audio channel (e.g. the left channel) containing the composite multi-track audio signal is then broadcast at radio frequencies.

Preferably, a rechargeable battery 644 provides power to components in the portable module 600 of FIG. 6, with the battery 644 therefore coupled, for example, to the RF audio transmit chain 642, as will be readily understood. A charger port 646 permits externally delivered electrical energy to be routed to the battery 644 via a suitable charger circuit 648.

To facilitate the co-location of the control module 600 and the media source player 604, the portable module 600 may include locking clips 680 (or the like) that engage into a releasable bracket 682 or anchor point affixed to or formed within the media source player 604.

With respect to the right channel 40 and the context audio track/background, the use of speakers 620 of the media centre may be preferable over the use of internal speaker 634. In this case, a preferred embodiment makes use of a switch to disable the right channel audio path to the internal speaker 634. For example, one such switch may make use of detection of the AV pin on the four-pole jack to switch out the internal speaker 634. With disablement of the right channel in the portable module 600, the right channel audio signal is re-routed back to the speakers 620 of the media centre 606, whereby improved ambience for the context audio track is experienced through the principal speakers 620 of the media system 620. From an implementation perspective, as will be readily appreciated, an in-line dongle may be provided to allow the selective re-routing of the right channel audio. Such a dongle may therefore include right and left audio channel input and output connectors, a signal feed in the form of shielded lead 632 and jack 631 (of FIG. 6) and a logic device with a switching function configured to control routing of the right audio channel.

The skilled addressee will readily appreciate that the various preferred features described above may be implemented independently of one another or in concert with each other where their co-existence is mutually permissible and complementary in the sense that the overall arrangement of configuration is improved.

Figure 7:
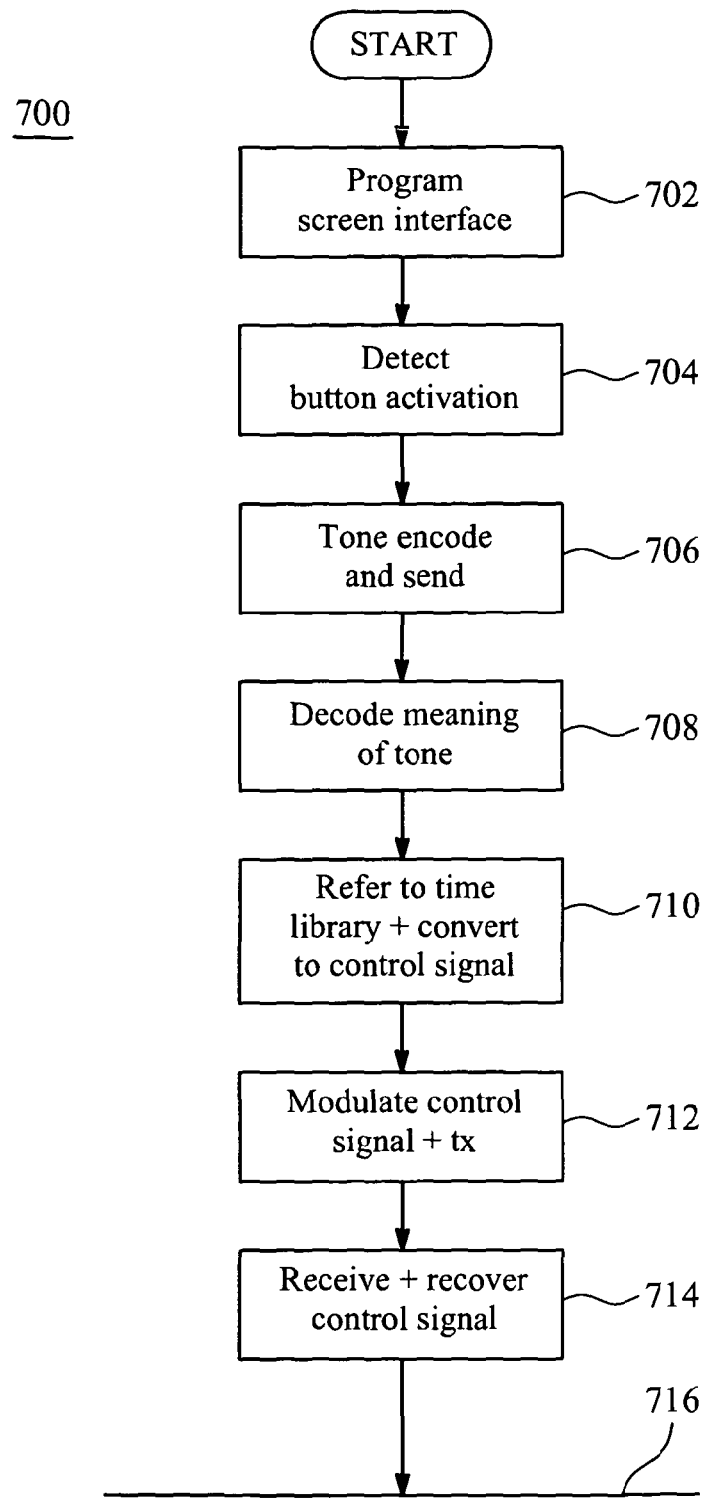
FIG. 7 is a flow chart showing commuting of a received tone-encoded signal into control signals for broadcast to affect functional control of external equipment.

Turning briefly to FIG. 7, a flow diagram 700 shows the commuting of a received tone-encoded signal into control signals for broadcast to affect functional control of external equipment.

At step 702, the media source device is programmed with a soft application that permits its interface to present a variety of buttons, sliders or control icons associated with specific functions of a remote device. Once a button (or the like) associated with a defined function (fn(x)) is actuated 704, e.g. by capacitive sensing within a touchscreen display, a corresponding tone is located from a local reference cache and the function then tone encoded and sent 706 to the portable module. At the portable module, the tone is applied to the decoder and interpreted by the PIC (650 of FIG. 6) to decode a meaning 708 for the received tone. Once a meaning is ascribed to the code through referencing the tone library, the meaning is converted into an appropriately formatted control signal that can be understood by the remote device whose function is to be controlled. The control signal is then modulated and broadcast 712, typically at relatively low power levels to reduce the potential for general spectral interference, via the data transmitter chain. At the remote device (either specifically addressed or just responsive to the modulated signal), the modulated signal is demodulated and the control signal recovered 714 and applied 716 to effect motor or function control at the remote device. Control can, for example and without limitation, result in: i) the opening or closing of a door or valve; ii) the actuation of a motor; iii) the energization or deactivation of an electric, pneumatic or hydraulic circuit; and/or iv) the arming of a device.

The data transmitter chain in the module 600 can, of course, be realised by a transceiver chain having increased functionality to support both downlink/broadcast transmissions from the communication module and also to receive and process limited uplink commands or acknowledgement signals from the remote toy(s). Such a transceiver would therefore be arranged to decode and interpret uplink data signals (in a reverse path from the interactive toy) to produce an effect or response in or at the media centre 606 or smartphone 604. Of course, this embodiment would mean that the remote interactive toy would itself include a transceiver module that would be responsive to a human-machine interface ("HMI"), such as a simple depression switch, associated or integrated with the remote toy. The remote toy would therefore be configured or arranged such that an input entered into the HMI by a user of the remote toy would generate a data burst sent back to the portable communications module 600. The data burst could be either a simple acknowledgement of receipt or a more detailed response providing feedback on what the user did (e.g. what button the user pressed on the toy's HMI) at the toy in responsive to the delivered interactive content. The interactive content might therefore be an audio output and/or a resolvable sensory effect brought about by control data sent to the remote toy. For example, the interactive audio download from the media player might ask a question that is output at the remote toy, with a response (either right or wrong) therefore expected to be returned by the user at the toy (via the toy's HMI and transceiver). Feedback concerning the interactive media content can therefore be received and/or assessed at the module 600 or the media player/computer.

It will, of course, be appreciated that the above description has been given by way of example only and that modifications in detail may be made within the scope of the invention. For example, while the preferred embodiment has been described in the context of a cuddly tool and interacting media program, the underlying ideas of using sub-audible tones uniquely assigned to a toy or other inanimate object (or a specific group of toys in the case of a chorus of synchronized responses) can be used in other contexts, including marketing displays in shop windows. The term "toy" should therefore be understood to include "mannequin" or "doll" or, in its broadest sense a device configured to provide a channel output discrete to the background or central output providing a context, script or baseline for a multi-site interaction.

Also, while a preferred embodiment makes use of the left channel audio output for transmission of the composite signal envelope (containing sub-audible code signatures), it will be understood that these could make use of the right audio channel and thus switched with the background media content. Furthermore, the preferred embodiment is directed towards the synchronization of audio output, although the principle of discrete embedded codes to effect opening of an output gate can be employed in a wider context, e.g. to support interactive video projection at the remote toy, such as cuddly bear in the like.

Also, while a preferred embodiment makes use of CTCSS signals, other coding schemes (such as dual tone multiple frequency, DTMF, or more elaborate in signal coding) can be substituted therefor or augmented therewith. For instance, in more advanced toys having greater numbers of operational features and therefore more motors, DTMF may be preferable and may be supplemental to CTCSS for audio output control. And in combination, DTMF can be sent to the remote toy when CTCSS code is not present, with this meaning that additional information can be sent to the toy without fear of transmission as audio output from the toy's speaker. Supplementary information received in this fashion be locally buffered and used to control or activate another part of the toy.

In certain embodiments, CTCSS activation codes (or the like) can be used in concert with data control tones (such as DTMF) whereby the audio activation (from detected CTCSS) is sequenced with motor control and actuation arising from detection of the data control tone.

The term sub-audible tone should be construed more broadly to encompass such alternatives, unless the specific context or embodiment requires otherwise. A high frequency code applied for the duration of the speech burst, for example, could also be used, although this would result in the receiver applying a bandpass filter to isolate the particular code from audio and/or video.

Finally, although the portable module 600 has been described as a discrete unit that can be attached and coupled to a media content delivery system, its functionality could be integrated directly into a computing tablet or, indeed, a more advanced media system or smartphone. The provision of a portable module, however, provides for retrofitting of the technical innovation of the preferred embodiments into existing devices that are already commercially available.

What is claimed is:

1. A portable communications module responsive to an incident signal the portable communications module comprising:
    an put configured:
    i) to split out a first audio channel containing a context audio track from the incident signal applied thereto, the input further arrange to direct the first audio channel along a first audio output path for selective audio output of the context audio track from a speaker either integrated with the portable communications module orexternal to the portable communications module; and
    ii) to direct a second audio channel in the incident sign ral to a wireless audio transmitter chain for broadcast, the second audio channel comprising a composite audio signal from a plurality of audio tracks, each audio track embedded with a unique activation code that is present for substantially an entire duration of audio activity in each audio seoment of each track; and
    iii) to apply a tone encoded signal in the incident signal to at least a tone decoder in a data transmitter chain distinct from the audio transmitter chain;
    a microcontroller coupled to the tone decoder, the microcontroller .arranged to interpret and translate the tone into a control signal related to functional control of remote equipment; and
    a data transmit chain, responsive to the microcontroller, the data transmit chain arranged to modulate the control signal onto a carrier for broadcast to the remote equipment to effect functional control thereof; and wherein
    the tone encoded data is filtered within the portable communications module to an extent that it is i of amplified within the first audio output path and is not processed by the RF audio transmitter chain.

2. The portable communications module according to claim 1, wherein the tone encoded signal is supplied in parallel to both the tone decoder and one of the wireless data transmit chain and the first audio output path.

3. The portable communications module according to claim 2, further including:
    a switch responsive to a physical connection of the incident signal to the portable communications module, the switch arranged selectively to route the first audio channel to the integrated speaker or an external speaker based on the nature of the physical connection.

4. The portable communications module according to claim 2, wherein the data transmit chain includes a radio frequency modulator.

5. The portable communications Module of claim 2, the module being integrated within an audio-visual device supporting stereo audits output.

6. A media delivery system containing the portable communications module of claim 2, the system further including at least one Of a smartphone and a media centre, said one of the smartphone and media centre coupled to the communications module and arranged provide the incident signal to the portable communications module.

7. The portable communications module according to claim 1, further including:
    a switch responsive to a physical connection of the incident signal to the portable communications module, the switch arranged selectively to route the first audio channel to the integrated speaker or an external speaker haled on the nature of the physical connection.

8. The portable communications module according to claim 7, wherein the data transmit chain includes a radio frequency modulator.

9. The portable communications module of claim 7, the module being integrated within an audio-visual device supporting stereo audio output.

10. A media delivery system containing the portable communications module of claim 7, the system further including at least one of a smartphone and a media centre, said one of the smartphone and media centre coupled to the communications module and arranged to provide the incident signal to the portable communications module.

11. The portable communications module according to claim 1, wherein the data transmit chain includes a radio frequency modulator.

12. The portable communications module of claim 11, the module being integrated within an audio-visual device supporting stereo audio output.

13. A media delivery system containing the portable communications module of claim 11, the system further including at least one of a smartphone and a media centre, said one of the smartphone and media centre coupled to the communications module and arranged to provide the incident signal to the portable communications module.

14. The portable communications module of claim 1, the module being integrated within an audio-visual device supporting stereo audio output.

15. A media delivery system containing the portable communications module of claim 1, the system further including at least one of a smartphone and a media centre, said one of the smartphone and media centre coupled to the communications module and arranged to provide the incident signal to the portable communications module.

16. The media delivery system of claim 15, wherein coupling of said one of said smartphone and media centre is through a wired connection.

17. The media delivery system of claim 16, wherein said one of said smartphone and media centre includes a signal processor arranged to apply a unique sub-audio tone to an audio source of the respective smartphone and media centre, the audio source processed by the signal processor to produce a composite audio signal having, at least one audio track associated with an interactive toy remotely located from the portable communications module and the respective smartphone and media centre, the composite audio signal communicated to the portable communications module as the incident signal, the composite audio signal being on the second audio channel.

18. The media delivery system of claim 15, wherein said one of said smartphone and media centre includes a signal processor arranged to apply a unique sub-audio tone to an audio source of the respective smartphone and media centre, the audio source processed by the signal processor to produce a composite audio signal having at least one a audio track associated with an interactive toy remotely located from the portable communications module and the respective smartphone and media centre, the composite audio signal communicated to the portable communications module as the incident signal, the composite audio signal being on the second audio channel.

\* \* \* \* \*